3,397,064
REFRIGERATED DOUGH PRODUCT
Samuel A. Matz, Liverpool, N.Y., assignor to The Borden Company, New York, N.Y., a corporation of New Jersey
No Drawing. Filed Feb. 19, 1965, Ser. No. 434,115
3 Claims. (Cl. 99—90)

ABSTRACT OF THE DISCLOSURE

Chemically leavened dough products for refrigerated storage and subsequent baking having incorporated therein a leavening composition in amount sufficient to leaven a dough and from about 0.1 to about 3 parts by weight, for every 100 parts by weight of flour in the dough, of a potassium polymetaphosphate.

---

In commercial refrigerated dough practice, there is ordinarily used, as one component of the leavening agent or gas generating system, a slowly acting sodium pyrophosphate of the approximate formula $Na_2H_2P_2O_7$ in combination with sodium bicarbonate. All ingredients are mixed, the resulting dough rolled out, the dough then sheeted and cut into blanks such as discs about 1.2–2 inches in diameter by ¼–½ inch thick. The cut-outs are dusted with rice flour or oiled to prevent sticking together. They are then stacked and packed in a suitable can. These cans are dough-tight but not gas-tight. As a result, air and carbon dioxide may and do escape so that the dough reaches and blocks the gas outlets. Within about 1.5–3 hours after the package is sealed, for instance, the biscuits will have so expanded as to fill the container and close the original vents for gas and the internal pressure of carbon dioxide generated by the leavening materials will have risen to around 8–16 p.s.i. Pressure within the can will be maintained over a period of 8 weeks or so if the biscuit dough and cans are normal and the storage temperature is between 40° and 50° F. All of the equipment including containers herein referred to are conventional and are not illustrated.

However, after about 6 weeks of storage at 40° to 50° F., the dough tends to deteriorate; both as to physical texture and as to handling properties when removed from the container for use. The dough pieces fail to hold their shape, become difficult to separate from each other when removed from the can, become moist and tacky, and when baked have a low volume. Thus, while bacterial growth is being inhibited, thereby increasing the shelf life of refrigerated dough products, the consequent extended periods of storage further aggravate the problem of dough deterioration.

It has now been found possible to make refrigerated dough products which will be resistant to non-microbial induced dough deterioration during normal storage periods, i.e., 6 weeks, and which can be stored for longer periods of time without deteriorating.

The present invention comprises refrigerated dough products containing from about 0.1% to about 3% of potassium polymetaphosphate, preferably potassium polymetaphosphate having a molecular weight of about 200,000.

The refrigerated dough discuits of the present invention can be any prepared by any conventional procedures used heretofore. That is to say, the materials such as flour, sugar, shortening, leavening agents, water flavoring materials, and other minor ingredients, and the proportions thereof are those conventionally used in making a variety of refrigerated dough products such as biscuits, turnovers, rolls, buns, Danish pastry, puff pastry and the like. The novel element of the dough is the polymetaphosphate. Typical examples of formulations that can be used, save for the polymetaphosphate, are those set forth in U.S. Patent No. 2,942,988 and in the book entitled "Bakery Technology and Engineering" by Samuel Matz, published by the AVI Publishing Company in 1960.

The potassium polymetaphosphate used is of the general formula $(KPO_3)_nK_2O$, preferably one having a molecular weight of about 200,000, although those having a chain length, $n$, of 5,000 or more are equally suitable. The potassium polymetaphosphate can be added in amounts from about 0.1% to about 3%, based on the weight of flour in the dough. Below 0.1% the effect is usually so small as to be undetectable, and above about 3% the improving effect does not usually increase and the dough may become excessively stiff and tough.

The potassium polymetaphosphate is ordinarily added along with the conventional dry ingredients, such as the flour and sugar, and the dough processed in the usual manner for making refrigerated doughs as set forth in the examples.

The invention will be further illustrated by detailed description in connection with the following specific examples for the practice of it. In these examples and elsewhere herein proportions are expressed as parts by weight unless specifically stated to the contrary.

Example 1

Biscuit doughs having the following composition were prepared:

|  | Parts by Weight | |
|---|---|---|
|  | Dough A | Dough B |
| Flour | 100 | 100 |
| Dextrose | 3.7 | 3.7 |
| Salt | 2.5 | 2.5 |
| Shortening | 8.3 | 8.3 |
| Dried nonfat milk | 4.0 | 4.0 |
| Sodium bicarbonate | 2.0 | 2.0 |
| Sodium acid pyrophosphate | 1.8 | 1.8 |
| Fumaric acid | .4 | .4 |
| Water | 60.0 | 60.0 |
| Potassium polymetaphosphate |  | .8 |

The dry ingredients were mixed in the bowl of an ordinary planetary mixer for one minute. The water was then added and mixing continued for four minutes at the high speed of the mixer. The dough was sheeted out, dusted with rice flour, and hexagonal pieces (weighing about 22 grams) were cut from the sheet. These pieces were stacked in rows of ten and then packed in cylindrical cans of fibrefoil laminate measuring five and one-half inches long by two inches in diameter. The filled cans were allowed to stand at room temperature for about two hours to proof and then were stored at 40° F.

Upon opening cans of both types after one day of storage, it was observed that dough B had held its shape better and the pieces were easier to separate. When the samples were baked and the specific volume of the biscuits compared, it was found that dough A had a specific volume of 3.32 compared to 3.39 for dough B, indicating only a slight improving effect of the additive on volume at this age. However, at nine days of age the value for A was 3.30 and for B 3.56. After seventeen days, A and B were 3.29 and 3.65, respectively. Also after nine and seventeen days dough B pieces held their shape whereas dough A tended to adhere together, and were deformed in shape.

Example 2

| | Parts by Weight | | |
|---|---|---|---|
| | C | D | E |
| Flour | 400 | 400 | 400 |
| Cane Sugar | 24.0 | 24.0 | 24.0 |
| Salt | 8.0 | 8.0 | 8.0 |
| Margarine | 20.0 | 20.0 | 20.0 |
| Nonfat milk solids | 48.0 | 48.0 | 48.0 |
| Sodium bicarbonate | 8.0 | 8.0 | 8.0 |
| Sodium acid pyrophosphate | 14.0 | 14.0 | 14.0 |
| Starter distillate | 1.2 | 1.2 | 1.2 |
| Water | 246.0 | 246.0 | 246.0 |
| Potassium polymetaphosphate | | 11.7 | 5.9 |

All of the ingredients, except the salt and soda were mixed for five minutes at the high speed of a horizontal dough mixer, the salt and soda were added, and the mixing completed in an additional four minutes at high speed. The dough was sheeted out, 80 grams of puff pastry margarine was placed on the dough sheet, the dough was folded to give two layers of margarine and three layers of dough, and the assemblage was sheeted out to one-half inch in thickness. The sheeted assemblage was folded to give three layers and the thickness again reduced. The folding and sheeting were repeated twice more. Hexagonal pieces (weighing about 27 grams) were cut from the finished sheet and then these were packed in a cylindrical can measuring five inches long by 2¼ inches wide after they had been dusted lightly with flour. The cans were allowed to stand at room temperature until they were proofed and developed internal pressure, after which they were stored at 40° F.

After three days, one can of each variable was opened. Doughs D and E seemed drier and the pieces seemed easier to separate than those from batch C. When baked, the specific volumes were C, 3.89, D, 4.10, and E, 3.92. After seven days, the specific volumes were 4.14, 4.32, and 4.39, respectively. After seventeen days, the specific volumes were 3.69, 4.78 and 4.56, respectively.

While the precise theory for the activity of the potassium polymetaphosphate is not completely understood, it is believed it prevents dough deterioration by linking up with the protein molecules in the dough to stiffen the dough and enable it to maintain its structure and integrity.

It is to be understood that it is intended to cover all changes and modifications of the examples of the invention herein chosen for the purpose of illustration which do not constitute departures from the spirit and scope of the invention.

What is claimed is:

1. A chemically leavened dough product for refrigerated storage and subsequent baking consisting essentially of said dough and a leavening composition in amount sufficient to leaven the dough and from about 0.1 to about 3 parts by weight, for every 100 parts by weight of flour in the dough, of a potassium polymetaphosphate.

2. The dough product of claim 1 wherein the polymetaphosphate is of the general formula $(KPO_3)_nK_2O$ wherein $n$ is an integer of at least 5,000.

3. The dough product of claim 2 wherein the potassium polymetaphosphate has a molecular weight of about 200,000.

References Cited

UNITED STATES PATENTS 3,052,549  9/1962  Kichline et al. _____ 99—95

OTHER REFERENCES

Van Wazer: "Phosphorous and Its Compounds," vol. I; Chemistry, 1958, Interscience Publishers, Inc., New York, pp. 674–675.

Tucker: "Phosphates in Foods," Cereal Science Today, April 1959, pp. 91–92.

RAYMOND N. JONES, *Primary Examiner.*